United States Patent Office 2,912,450
Patented Nov. 10, 1959

2,912,450

REACTION PRODUCTS OF DIALKYL PHOSPHORO-THIOLOTHIONATES AND ACETYLENIC COMPOUNDS

Richard L. McConnell and Harry W. Coover, Jr., Kingsport, Tenn., assignors to Eastman Kodak Company, Rochester, N.Y., a corporation of New Jersey No Drawing. Application November 14, 1956
Serial No. 622,023

6 Claims. (Cl. 260—461)

This invention relates to new organophosphorus compounds and their method of preparation. In a specific aspect this invention relates to the reaction of dialkyl phosphorothiolothionates and acetylenic compounds and to the resulting products.

Organophosphorus compounds have evidenced marked utility and importance in many areas. They have been employed as insecticides, fungicides, pesticides and related uses. Consequently, it is of considerable importance to the art to have new and useful organophosphorus compounds and, moreover, to have a new process for the production of organophosphorus compounds. Therefore, it is an object of this invention to provide new and useful organophosphorus compounds, to provide new and useful methods of producing organophosphorus compounds, and to provide new compounds which are valuable as insecticides and in insecticidal compositions. These and other objects will be apparent from the description and claims which follow.

We have found that new and valuable organophosphorus compounds can be produced by the novel process which comprises reacting a dialkyl phosphorothiolothionate with an acetylenic compound. This process may be effected advantageously by reacting a dialkyl phosphorothiolothionate containing 1 to 4 carbon atoms in each alkyl group with an acetylenic compound containing 1 carbon-to-carbon triple bond. Acetylenic compounds which are suitable in the practice of this invention include propargyl alcohol, propargyl acetate, propargyl bromide, 1,4-butynediol, 1,4-dichloro-2-butyne, alkyl esters of propiolic acid, 2-methyl-3-butyn-2-ol, 3-methyl-1-pentyne-3-ol, 2,5-diphenyl-3-hexyne-2,5-diol, 1-ethynylcyclohexan-1-ol, 3-phenyl-1-butyn-3-ol, bis(1-hydroxycyclohexyl)acetylene, acetylenedicarboxylic acid, and alkyl esters of acetylenedicarboxylic acid.

The following equation is illustrative of the reaction involved in our process:

$$\begin{array}{c}RO\\ \diagdown\\ RO\diagup\end{array}\!\!\!\!P\!\!\begin{array}{c}S\\ \|\\ \end{array}\!\!-SH + HOCH_2C\!\equiv\!CH \longrightarrow \begin{array}{c}RO\\ \diagdown\\ RO\diagup\end{array}\!\!\!\!P\!\!\begin{array}{c}S\\ \|\\ \end{array}\!\!-S-C\!\!=\!\!CH_2\\ \quad\quad\quad\quad\quad\quad\quad\quad\quad\quad\quad\quad\quad\quad\quad\quad\quad\quad |\\ \quad\quad\quad\quad\quad\quad\quad\quad\quad\quad\quad\quad\quad\quad\quad\quad\quad\quad CH_2OH$$

It is to be noted, in this regard, that the foregoing is offered only in illustration and is not intended to limit the invention in any way to this representation.

In the practice of this process, we prefer to react equimolar quantities of the dialkyl phosphorothiolothionate and the acetylenic compound; however, any molecular ratio of the reactants is in accord with the invention and will give the desired products. The operable temperature range of this reaction is from −25 to 150° C., but a preferred range is 25 to 125° C. Although inert solvents may be used, we prefer to operate without a solvent. Suitable inert solvents include the normally liquid hydrocarbons such as pentane, heptane, benzene and toluene, chlorinated hydrocarbons, ethers and esters. Suitable reaction periods for this process include reaction times within the range of 30 min. to 8 hours. Although catalysts are not required, basic catalysts such as tertiary amines can be used.

The novel compounds of our invention produced by the above-described process can be characterized by the following formula:

$$\begin{array}{c}RO\\ \diagdown\\ RO\diagup\end{array}\!\!\!\!P\!\!\begin{array}{c}S\\ \|\\ \end{array}\!\!-S-C\!\!=\!\!CH\\ \quad\quad\quad\quad\quad\quad\quad\quad |\quad |\\ \quad\quad\quad\quad\quad\quad\quad\quad X\ \ Y$$

where X is selected from the group consisting of —$CH_2OH$, —$CH_2Cl$, —$CH_2Br$, —$CH_2OC(O)R_1$,

—$C(O)OR_1$ $$-\underset{\underset{HO}{|}}{\overset{\overset{CH_2CH_3}{|}}{C}}\!\!-\!\!\underset{CH_2CH_3}{CH_2},\ \ -\underset{\underset{OH}{|}}{\overset{\overset{CH_3}{|}}{C}}\!\!-\!\!CH_3,\ -\!\!\bigcirc\!\!\!-,\ -\underset{\underset{OH}{|}}{\overset{\overset{R_1}{|}}{C}}\!\!-\!\!R_1$$

and Y is selected from the group consisting of —H, —$CH_2OH$, —$CH_2Cl$, and $$-\underset{\underset{OH}{|}}{\overset{\overset{CH_2CH_3}{|}}{C}}\!\!-\!\!CH_2CH_3$$

and R and $R_1$ are lower alkyl groups containing from 1 to 4 carbon atoms. It is to be noted that the carbon-to-carbon double bond of the compound represented by the above formula is in the same position as the carbon-to-carbon triple bond of the acetylenic reactant used to produce said compounds. Thus, while the formulas given above are believed to be descriptive of the compounds of our invention, the compounds also may be characterized as reaction products of the above-described process.

In order to further illustrate and explain our invention, the following examples are offered:

*Example 1.—O,O-diethyl S-[1-(hydroxymethyl)vinyl]-phosphorothiolothionate*

$$\underset{\underset{SP(S)(OC_2H_5)_2}{|}}{HOCH_2C\!=\!CH_2}$$

Propargyl alcohol (0.1 mole) and diethyl phosphorothiolothionate (0.1 mole) were mixed and stirred while carefully heated to 125° C. for 40 minutes. The reaction mixture was allowed to cool to 25° C. with stirring and then stripped under reduced pressure (1–2 mm.) to remove volatile impurities. The product is a transparent, amber colored oil, $n_D^{20}$ 1.5123.

*Example 2.—O,O-diethyl S-(3-hydroxy-1-hydroxymethyl-propenyl)phosphorothiolothionate*

$$\underset{\underset{SP(S)(OC_2H_5)_2}{|}}{HOCH_2C\!=\!CHCH_2OH}$$

Diethyl phosphorothiolothionate (0.1 mole) and 1,4-butynediol (0.1 mole) were mixed and stirred. There is no apparent reaction, and the butynediol does not go into solution. The reaction mixture was heated with stirring to a temperature of 105° C. for 1½ hours. Then the reaction mixture was cooled to 25° C., and stripped under reduced pressure to remove volatile impurities. The product is a transparent, light brown oil, $n_D^{20}$ 1.5253. It adds bromine readily which indicates that the product is unsaturated.

*Example 3.—O,O-diethyl S-(3-chloro-1-chloromethyl-propenyl)phosphorothiolothionate*

$$\underset{\underset{SP(S)(OC_2H_5)_2}{|}}{ClCH_2C\!=\!CHCH_2Cl}$$

This yellow oily product was prepared by reacting a stirred mixture of 1,4-dichloro-2-butyne (0.1 mole) and diethyl phosphorothiolothionate (0.1 mole) at 95° C. for 1 hour.

*Example 4.—O,O-dimethyl S-[1(bromomethyl)vinyl]-phosphorothiolothionate*

$$\underset{\underset{SP(S)(OCH_3)_2}{|}}{BrCH_2C=CH_2}$$

This product was prepared by heating propargyl bromide (0.1 mole) and dimethyl phosphorothiolothionate (0.1 mole) at 95° C. for 1 hour with stirring.

*Example 5.—O,O-diisopropyl S-[1-(acetoxymethyl)-vinyl]phosphorothiolothionate*

$$\underset{\underset{SP(S)[OCH(CH_3)_2]_2}{|}}{CH_3COOCH_2C=CH_2}$$

This product was prepared by heating propargyl acetate (0.1 mole) and diisopropyl phosphorothiolothionate (0.1 mole) at 95° C. for 2 hours with stirring.

*Example 6.—O,O-diisobutyl S-(1-ethoxycarbonylvinyl)-phosphorothiolothionate*

$$\underset{\underset{SP(S)[OCH_2CH(CH_3)_2]_2}{|}}{CH_2=CCOOC_2H_5}$$

This product was prepared by heating the ethyl ester of propiolic acid (0.1 mole) and diisobutyl phosphorothiolothionate (0.1 mole) at 110° C. for 3 hours with stirring.

*Example 7.—O,O-diethyl S-[1,2-bis(1-hydroxycyclohexyl)vinyl]phosphorothiolothionate*

This compound was prepared by heating a stirred mixture of diethyl phosphorothiolothionate (0.1 mole), bis-(1-hydroxycyclohexyl)acetylene (0.1 mole), and triethylamine (6 drops) on the steam bath for 4½ hours. The product is a viscous, orange, transparent oil, $n_D^{20}$ 1.5222.

*Example 8.—O,O-diethyl S-(2-hydroxy-1-methylene-2-phenylpropyl)phosphorothiolothionate*

This compound was prepared by mixing diethyl phosphorothiolothionate (0.1 mole) and 3-phenyl-1-butyn-3-ol (0.1 mole) in 100 ml. of benzene and refluxing for 2½ hours on the steam bath. The benzene was evaporated under reduced pressure at 25° C., leaving a red oil, $n_D^{20}$ 1.5330.

*Example 9.—O,O-diethyl S-[1-(1-hydroxycyclohexyl)-vinyl]phosphorothiolothionate*

This compound was prepared by heating a stirred mixture of diethyl phosphorothiolothionate (0.1 mole), 1-ethynylcyclohexan-1-ol (0.1 mole) and triethylamine (1 ml.) on the steam bath for 1 hour. The product is a viscous yellow oil, $n_D^{20}$ 1.5200.

*Example 10.—O,O-diethyl S-(2-hydroxy-2-methyl-1-methylenepropyl)phosphorothiolothionate*

This compound was prepared by heating a stirred mixture of diethyl phosphorothiolothionate (0.1 mole) and 2-methyl-3-butyn-2-ol (0.1 mole) for 1 hour on the steam bath.

While the marked utility of organophosphorus compounds in general has been noted, the compounds of our invention have been found to be valuable when used as insecticides or in insecticidal compositions. The following is offered in illustration of this important aspect of our invention:

Tests against mites and mite eggs were carried out in the following manner. Acetone solutions containing 1% of the candidate compounds were prepared and diluted with water to give solutions containing 1000 p.p.m., 100 p.p.m., 30 p.p.m., and 10 p.p.m. of the candidate compounds for testing. Two heavily infested bean leaves containing both eggs and adult two-spotted mites (*T. bimaculatus*) were carefully dipped in the above solutions and dried in a gentle air stream. The leaves were then placed on damp paper toweling in Petri dishes and observed after 24 hours for mortality among the adult mites. The leaves were observed again after 7 days to determine the number of eggs killed by the treatment.

It should be noted that tests using acetone-water solutions (containing none of the toxicant) kill neither mites nor mite eggs. This is the blank run referred to in the following table:

| Toxicant | Concentration, p.p.m. | Percent Kill, Mites | Percent Kill, Mite Eggs |
|---|---|---|---|
| 1. Blank | 0 | 0 | 0 |
| 2. HOCH$_2$C=CH$_2$ <br> $\|$ <br> SP(S)(OC$_2$H$_5$)$_2$ | 1,000 <br> 100 <br> 30 <br> 10 | 100 <br> 95 <br> 93 <br> 57 | 98 <br> 50 <br> |
| 3. HOCH$_2$C=CHCH$_2$OH <br> $\|$ <br> SP(S)(OC$_2$H$_5$)$_2$ | 1,000 <br> 100 | 96 <br> 24 | 60 <br> 3 |
| 4. BrCH$_2$C=CH <br> $\|$ <br> SP(S)(OCH$_3$)$_2$ | 1,000 <br> 100 <br> 30 | 100 <br> 98 <br> 87 | 95 <br> 88 <br> 57 |

Although the invention has been described in considerable detail with particular reference to certain preferred embodiments thereof, variations and modifications can be effected within the spirit and scope of the invention as described hereinabove, and as defined in the appended claims.

We claim:

1. As a new composition of matter, O,O-diethyl S[1-(hydroxymethyl)vinyl] phosphorothiolothionate having the formula:

$$\underset{\underset{SP(S)(OC_2H_5)_2}{|}}{HOCH_2C=CH_2}$$

2. As a new composition of matter, O,O-diethyl S-(3-hydroxy-1-hydroxymethylpropenyl)phosphorothiolothionate having the formula:

$$\underset{\underset{SP(S)(OC_2H_5)_2}{|}}{HOCH_2C=CHCH_2OH}$$

3. A process according to claim 6 wherein propargyl alcohol is reacted with diethyl phosphorothiolothionate.

4. A process according to claim 6 wherein 1,4-butynediol is reacted with diethyl phosphorothiolothionate.

5. As a new composition of matter, a compound having the structural formula:

$$\begin{array}{c} RO\quad S \\ \phantom{RO}\diagdown \| \\ \phantom{RO}P-S-C=CH \\ \phantom{RO}\diagup \quad | \quad | \\ RO\quad\quad X\quad Y \end{array}$$

where X is selected from the group consisting of

—CH$_2$OH

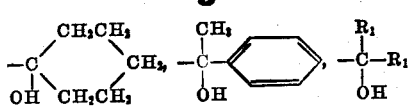

and Y is selected from the group consisting of —H, —CH₂OH, and

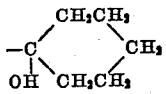

and R and R₁ are lower alkyl groups containing from 1 to 4 carbon atoms.

6. The process for producing new organophosphorus compounds which comprises reacting a dialkyl phosphorothiolothionate containing from 1 to 4 carbon atoms in each alkyl group with a compound having the structural formula XC≡CY, wherein X is selected from the group consisting of —CH₂OH,

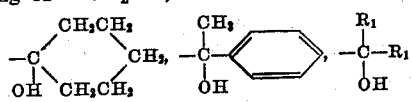

and Y is selected from the group consisting of —H, —CH₂OH, and

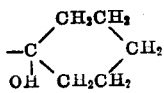

and $R_1$ is an alkyl group containing from 1 to 4 carbon atoms at a temperature within the range of —25 to 150° C. for a period of time within the range of 30 minutes to 8 hours and in the absence of a catalyst for the reaction.

References Cited in the file of this patent

UNITED STATES PATENTS

| | | |
|---|---|---|
| 2,528,732 | Augustine | Nov. 7, 1950 |
| 2,565,920 | Hook et al. | Aug. 28, 1951 |
| 2,589,326 | Oberright | Mar. 18, 1952 |
| 2,685,552 | Stiles | Aug. 3, 1954 |
| 2,744,128 | Morris et al. | May 1, 1956 |

FOREIGN PATENTS

| | | |
|---|---|---|
| 448,123 | Italy | May 10, 1949 |
| 478,127 | Italy | Mar. 2, 1950 |

OTHER REFERENCES

Reppe: Acetylene Chemistry, 1949, p. 58.
Allen et al.: J. Am. Chem. Soc., 77, 2871–2875 (1955).
Pudovic: Doklady Akad. Nauk. SS.S.R., 105, 735–737 (1955), cited in Chemical Abst., 50, 11230–11231 (1956).

UNITED STATES PATENT OFFICE
Certificate of Correction

Patent No. 2,912,450                                                November 10, 1959

Richard L. McConnell et al.

It is hereby certified that error appears in the printed specification of the above numbered patent requiring correction and that the said Letters Patent should read as corrected below.

Column 3, lines 32 to 38, Example 7, the formula should appear as shown below instead of as in the patent:

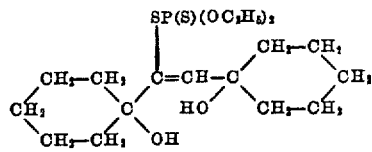

Signed and sealed this 21st day of June 1960.

[SEAL]

Attest:
KARL H. AXLINE,
*Attesting Officer.*

ROBERT C. WATSON,
*Commissioner of Patents.*